INVENTORS
CALVIN D. LOYD
THEODORE L. OBERLE
RONALD L. SATZLER

ATTORNEYS

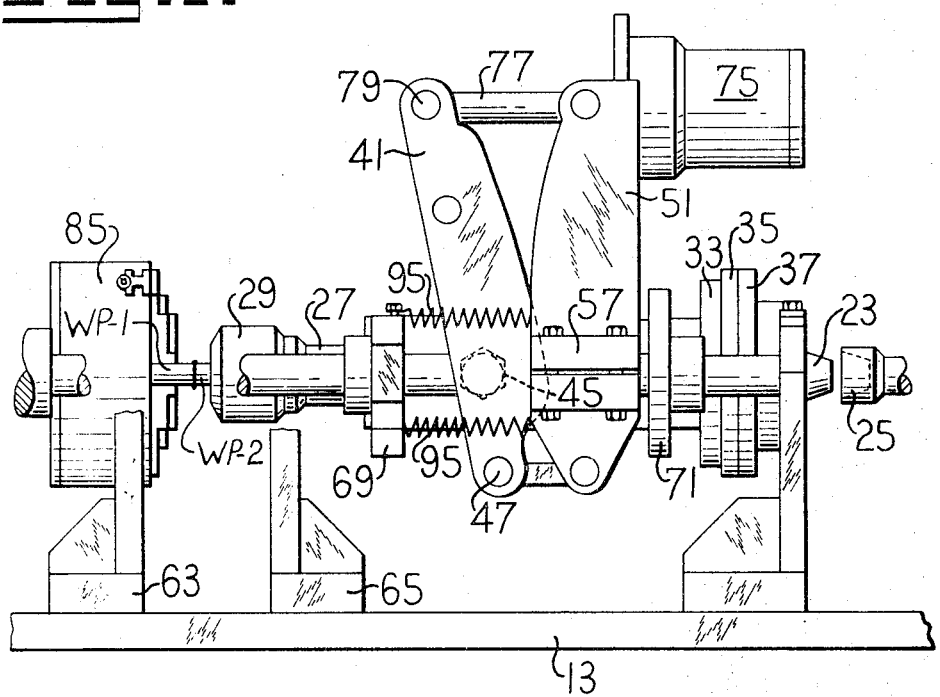

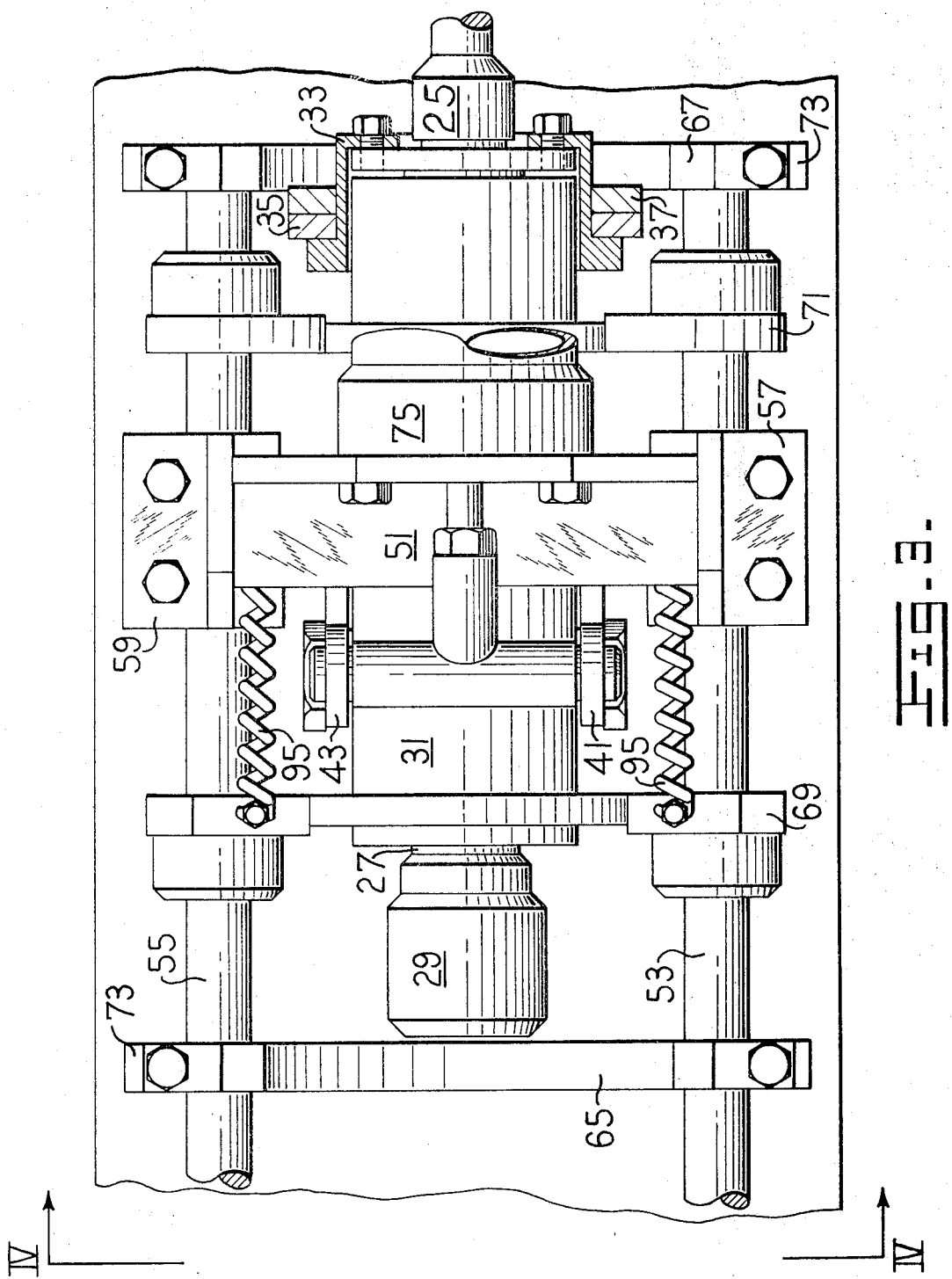

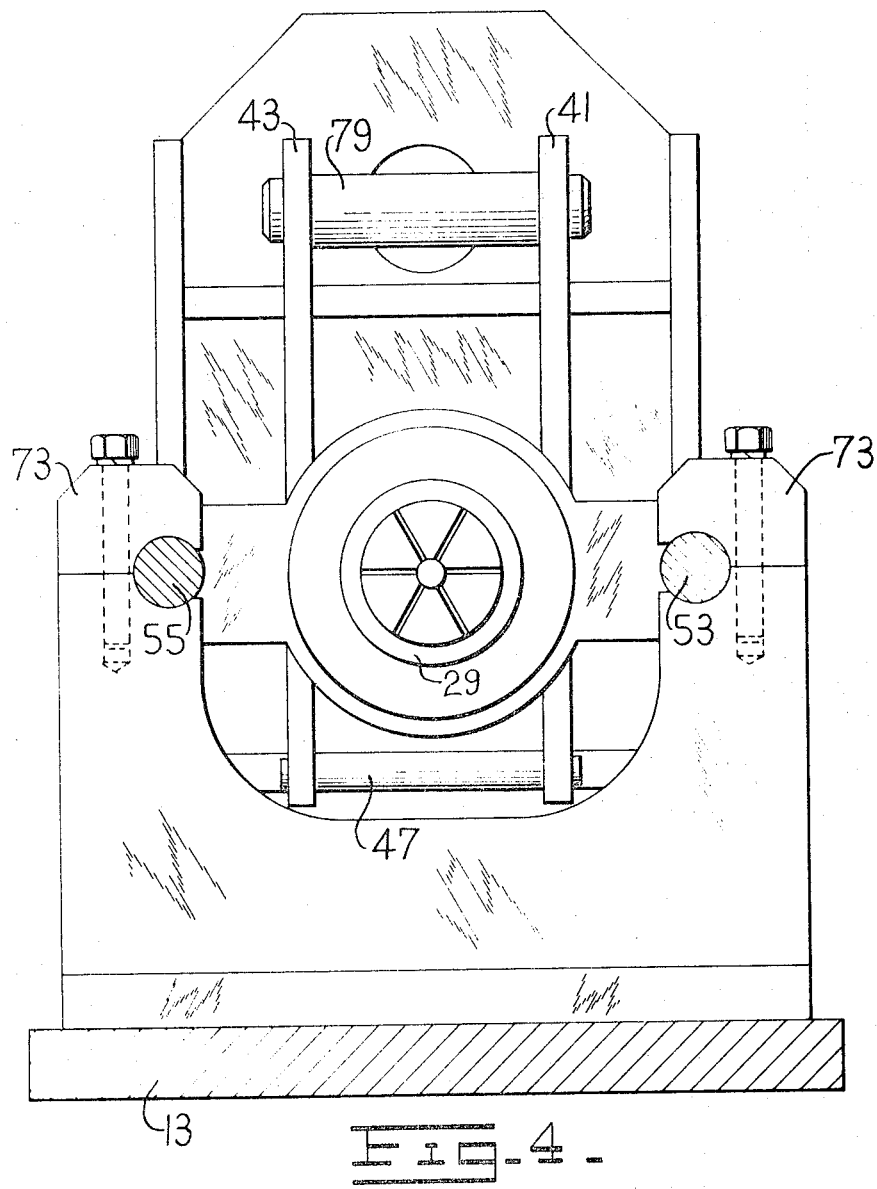

United States Patent Office 3,545,071
Patented Dec. 8, 1970

3,545,071
HIGH SPEED FRICTION WELDER
Calvin D. Loyd, Peoria, Theodore L. Oberle, Washington, and Ronald L. Satzler, Metamora, Ill., assignors to Caterpillar Tractor Co., Peoria, Ill., a corporation of California
Filed Mar. 14, 1968, Ser. No. 713,050
Int. Cl. B23k 27/00
U.S. Cl. 29—470.3                9 Claims

ABSTRACT OF THE DISCLOSURE

An air turbine rotates a movable collet chuck through a cone and cup friction clutch. The collet chuck is driven toward an immovable four-jaw chuck and this movement causes simultaneous release of the clutch and contact of the workpieces held in the chucks.

BACKGROUND OF THE INVENTION

This invention relates to improvements in friction welding apparatus of the general type wherein two work pieces are subjected to relative rotation while in contact with each other to generate frictional heat to raise the work pieces to a suitable welding temperature wherein the relative rotation subsides and workpieces become bonded to each other.

Friction welding has become an important technique in the art of joining metals. Many of the prior art friction welding machines have proven to be inadequate however due to the inability to deliver a precise amount of energy to the parts being welded, particularly when the parts are rotated at a high relative speed while maintaining a low inertial energy. The inadequacy of such machines is of great consequence in such cases as when the confronting surfaces are of small areas, the materials have a high thermal conductivity, the materials are unable to withstand high torque, or when they require a high rotational speed to generate sufficient friction heat.

Many of the machines known in the prior art have performed unsatisfactorily due to bending in the supporting frame and the tendency of the rotatably driven spindle to deflect and vibate as the parts being welded are forceably urged together. When welding small diameter parts or thin wall tubes such bending, deflection, and vibration should be eliminated if at all possible.

SUMMARY OF THE INVENTION

While this invention is appliacable to all friction welding processes, it will be specifically described with respect to performing the inertia welding process as described, for example, in United States Patent No. 3,273,233.

In the inertia welding process, the energy required to bring the common interface of the parts to a bondable condition is stored as kinetic energy in rotating weights.

These weights generally take the form of one or more flywheels and are connected to one of the parts. The entire energy necessary to form the bond is stored in the weights prior to engagment of the parts at the interface. This stored energy is discharged into the interface through frictional heating and plastic working developed at the interface as the rubbing contact slows the rotating weights and the bonding cycle is concluded.

Thus, the present invention relates to a high speed friction welder and method of welding. More particularly, it relates to friction welding in which a precise amount of energy is delivered to parts relatively rotated at high speeds while maintained at low inertia levels.

It is therefore an object of the present invention to provide a friction welding machine and method of welding which entails delivering a precise amount of energy for frictionally welding parts together.

It is also an object of this invention to provide such a machine and method for friction welding parts having a low inertial mass.

It is also an object of the present invention to provide such a machine and method for friction welding parts having low inertia mass and a small interface area.

It is also an object of this invention to provide such a machine and method for welding materials having high thermal conductivity.

Another object of this invention is to provide such a machine and method for welding materials unable to withstand high torques.

A still further object of this invention is to provide such a machine which minimizes bending, deflection, and vibration during the welding process.

Other objects of the invention will become apparent to those skilled in the art upon perusal of the following description in light of the accompanying drawings which illustrate a preferred embodiment of the invention. Other embodiments of this invention using similar or equivalent structure will become obvious to those skilled in the art, without departing from the present invention as defined in the appended claims.

BRIEF DESCRIPTION OF THE DRAWINGS

In the drawings:

FIG. 2 is a view, similar to FIG. 1, of a portion of the embodiment with the parts in the position assumed during the friction welding process;

FIG. 3 is a top view of a portion of the apparatus taken along a line III—III of FIG. 1; and FIG. 4 is a cross-sectional view of the apparatus taken along a line IV—IV of FIG. 3.

DETAILED DESCRIPTION

Figure 1:
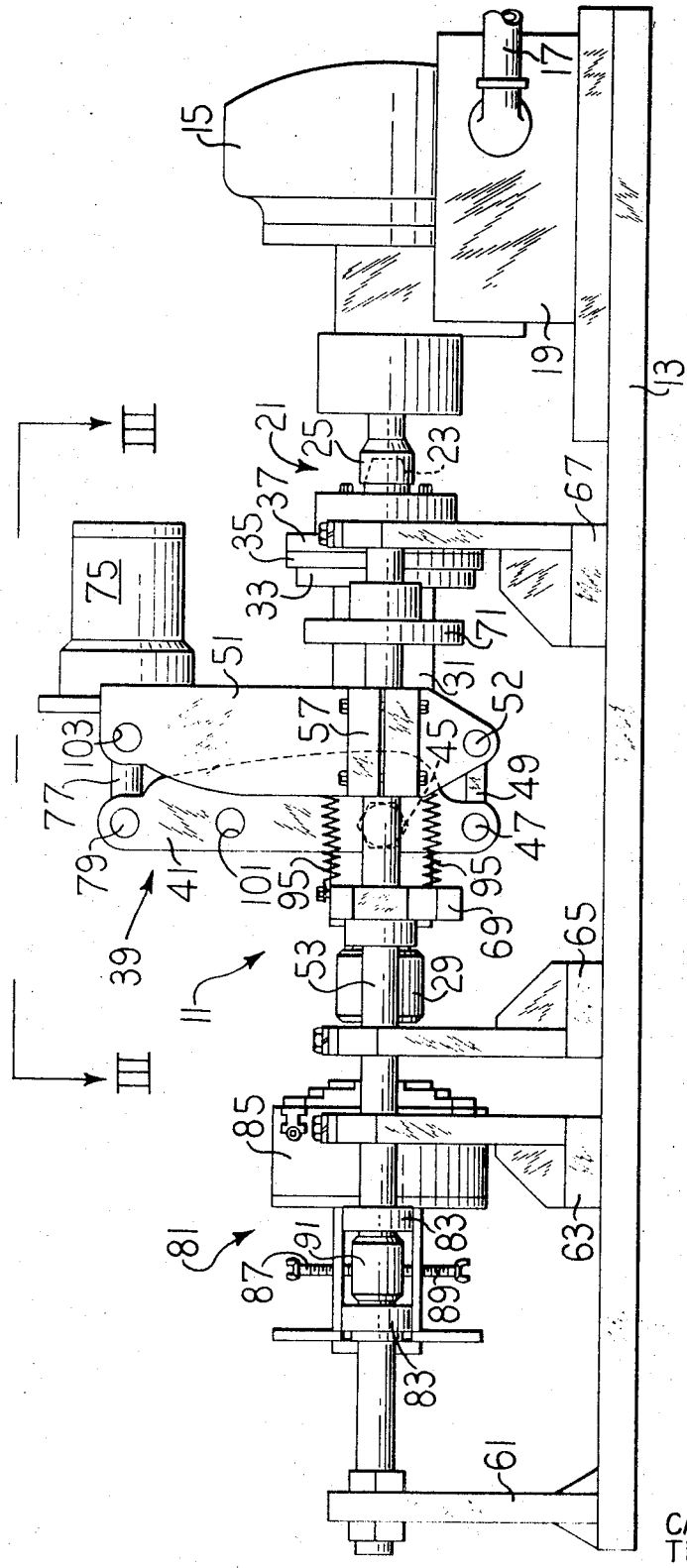
FIG. 1 is a side elevational view of a preferred embodiment of the invention with the parts in a position assumed by the apparatus prior to the commencement of the friction welding process.

Referring to FIG. 1, there is shown an inertia friction welding machine 11 mounted on a base or bed plate 13. The machine is driven by a conventional air turbine 15 which receives compressed air from an intake pipe 17 and a manifold 19. Power is transferred from the turbine to the machine by a friction drive clutch 21 comprising a cone 23 and cup 25. Although another type of clutch may be satisfactorily used to couple the machine and the turbine, it has been found that the cone and cup clutch provides a very satisfactory instantaneous disconnect for a reason to be described below.

In this embodiment the cone element 23 of the clutch is connected to a spindle 27 upon which is mounted a collet chuck 29. A spindle housing 31 extends along substantially the entire length of the spindle as shown in FIG. 3, a flywheel housing 33 is attached to the spindle at the rear of the spindle housing and a plurality of flywheels, such as 35 and 37 are mounted on the flywheel housing. The flywheels and flywheel housing may be removed if desired or more flywheels may be added for the storage of a greater amount of kinetic energy.

A pressure lever 39, formed by a pair of plates 41 and 43 which are fastened to the spindle housing 31 by a pin 45, pivots about a pin 47. A plate 49 attached to pin 47 fastens the pressure lever 39 to a support assembly 51 by means of a pin 52. The support assembly 51 is fixedly mounted on a pair of tie bars 53 and 55 by two split bracket assemblies 57 and 59. The tie bars are held by four vertical, U-shaped support assemblies 61, 63, 65, and 67. The supports, in turn, are fastened to the bed plate 13. The spindle housing 31 is also mounted on the tie bars by means of assemblies 69 and 71 which are slidable relative to the bars. FIG. 4 shows how the tie bars pass through the support assemblies and how split clamps 73, on the top of both sides of each support, fasten the tie bars to the support.

Pressure lever 39 is pivoted about pin 47 to the position shown in FIG. 2 by means of a pressure cylinder 75 mounted on the support 51. The cylinder actuates the lever by means of a rod 77 and pin 79. Pivoting of the lever causes the spindle housing to be moved forward due to the movement of pin 45 and movement of the spindle housing causes the spindle, collet chuck, and cone element 23 to advance to the position shown in FIG. 2.

The tire bars 53 and 55 also serve to support a tailstock assembly 81 by passing through bushings 83 of the assembly. A non-rotatable chuck 85, which may be of the four-jaw type, is mounted on the tailstock assembly and a backup bar (not shown) is placed between the support 61 and the assembly 81 to keep chuck 85 from moving. Set screws 87 and 89 are tightened against floating sleeves 91 mounted between the bushings 83 and serve to wedge the sleeves against the tie bars so as to take up excess clearance between the tie bars and the bushings.

In operation of the machine, a weld is made in the following manner:

A weld piece WP-2 is firmly clamped in collet chuck 29 and a weld piece WP-1 is clamped in the chuck 85. The chuck 85 is then positioned by sliding the tailstock 81 along the tie bars until the weld pieces are in close proximity. A backup bar is then placed between the tailstock and support 61 and the sleeves 91 are wedged against the tie bars. Compressed air is fed into the air turbine 15 which will rotate the spindle 27 and chuck 29. At a predetermined velocity or speed of rotation, the pressure cylinder 75 will pivot lever 39 as shown in FIG. 2. This actuation causes the cone and cup friction clutch to become disengaged and the weld pieces to come together under pressure. The pressure and relative motion causes the weld pieces to heat, flash, and then weld. The weld is completed as the spindle comes to rest.

When the pressure cylinder is actuated, a solenoid valve (not shown) closes the air intake to the air turbine so that it stops while the weld is being made.

When the weld is completed, pressure cylinder 75 is deactivated and a spring within the cylinder acts in coordination with springs 95 to bias the spindle back to the position shown in FIG. 1. When the chucks 29 and 85 are loosened, the spindle does return to the initial position. The backup bar may then be removed and the tailstock assembly is pulled back on the tie rods so that the weldment can be removed from the machine.

Since the workpieces come into contact nearly simultaneously with the separation of clutch assembly 21, the revolving components of the power source do not add energy to the weld and the spindle does not coast long enough to lose energy. Thus, in a properly operated machine the spindle ceases rotation at the moment the weld is completed, rather than continuing to rotate after optimal welding conditions have been attained.

The pressure range of the machine may be varied by using different pressure cylinders or by removing pin 79 from the position shown in the drawing and inserting it instead in a lower position in the plates 41–43, such as through coaxial holes 101 therein. When the pressure cylinder is fastened in the lower position, it is possible to attach plate 49 between the tops of the lever 39 and support member 51, using aperture 103 in support member 51 and the holes in plates 41 and 43 vacated by the now-lowered pin 79. This arrangement provides the lower pressure ranges desired.

Thus, the applicants have disclosed a friction welding machine which permits the driving of a spindle to very high speeds by means of an air turbine, while allowing the turbine to be disconnected from the spindle before welding, thereby keeping the inertia mass small. The machine provides safe and vibration free operation of the spindle at very high speeds due to the fact that the flywheel revolves at or near the plane of the spindle bearing. Distortion and bending is eliminated by the attachment of the loading lever to the spindle housing and the support member whereby it is unnecessary to attach it to the horizontal tie bars or to the machine bed plate. This causes the tie bars to experience a tension loading only.

While the illustration and description have shown a preferred embodiment of the invention it is to be understood that these are capable of variation and modification, and, therefore, the invention is not limited to the precise details set forth above, but rather includes such changes and alterations as fall within the purview of the following claims.

We claim:

1. The method of forming a weldment comprising the steps of holding one workpiece in a fixed position, holding a second workpiece in proximate axial relationship thereto, providing a cone-and-cup friction clutch between said second workpiece and a rotational power source, activating said source to impart high speed rotational movement through said clutch to said second workpiece, imparting an axial movement to said second workpiece and by said axial movement withdrawing the cone from the cup of said friction clutch while simultaneously forcing said workpieces together when said rotating workpiece is rotated at a predetermined speed, and dissipating a predetermined amount of kinetic energy into the weld so that rotation ceases as the weld is completed.

2. A friction welding machine comprising a base, an axially fixed holding means mounted on said base and adapted to hold a first piece which is to be welded to a second piece, an axially movable holding means movably mounted on said base and adapted to hold said second piece for initial rotational movement and for subsequent movement while rotating along an axis common to both of said holding means to a position in contact with said first piece, power means and clutch means, said clutch means connecting said power means to said movable holding means for said initial rotational movement thereof, and means connected to said movable holding means for moving said movable holding means along said axis toward said fixed holding means while simultaneously by such axial movement disconnecting said movable holding means from said power means at said clutch means.

3. The machine of claim 2 wherein said clutch means is a cone-and-cup friction clutch and said power means includes a pneumatically actuated turbine.

4. The machine of claim 3 wherein said means for moving said movable holding means comprises a pressure actuated means which forces said movable holding means toward said fixed holding means while separating the cone-and-cup elements of said clutch.

5. A friction welding machine comprising a base, a plurality of longitudinal bars mounted on said base defining an axis parallel thereto, a first chuck fixed against axial or rotational movement mounted on said bars and adapted to hold a first piece which is to be welded to a second piece, a second chuck mounted on one end of a spindle for holding said second piece in axially aligned proximity to said first piece, said spindle being rotationally and axially movably mounted on said bars, means for moving said second chuck and spindle toward the first chuck along said axis, a first clutch element mounted on the end of the spindle which is opposite said one end, a rotational power means mounted on said base and a cooperating, second clutch element mounted on said power means and adapted to engage said first clutch element when said pieces are separated, whereby actuation of said moving means causes the second piece to be advanced axially toward the first piece for welding contact therewith and at the same time and by such axial movement separates the clutch elements and thereby disengages the power means from the spindle.

6. The machine of claim 5 including biasing means forcing said chucks apart.

7. The machine of claim 5 including kinetic energy storing means mounted on said spindle whereby only a predetermined amount of such energy is utilized in forming a weld between workpieces held in said chucks and the kinetic energy stored in said rotational power means is not dissipated in said weld.

8. The machine of claim 5 wherein said moving means comprises an adjustable link means fastened between a pressure actuated means and a housing mounted on said spindle.

9. The machine of claim 5 wherein said rotational power means comprises a high speed turbine.

References Cited

UNITED STATES PATENTS

| | | | |
|---|---|---|---|
| 3,234,644 | 2/1966 | Hollander | 228—2 |
| 3,417,457 | 12/1968 | Burke et al. | 29—470.3 |
| 3,388,849 | 6/1968 | Blum et al. | 228—2 |

JOHN F. CAMPBELL, Primary Examiner

R. J. CRAIG, Assistant Examiner

U.S. Cl. X.

228—2; 156—73